No. 788,920.

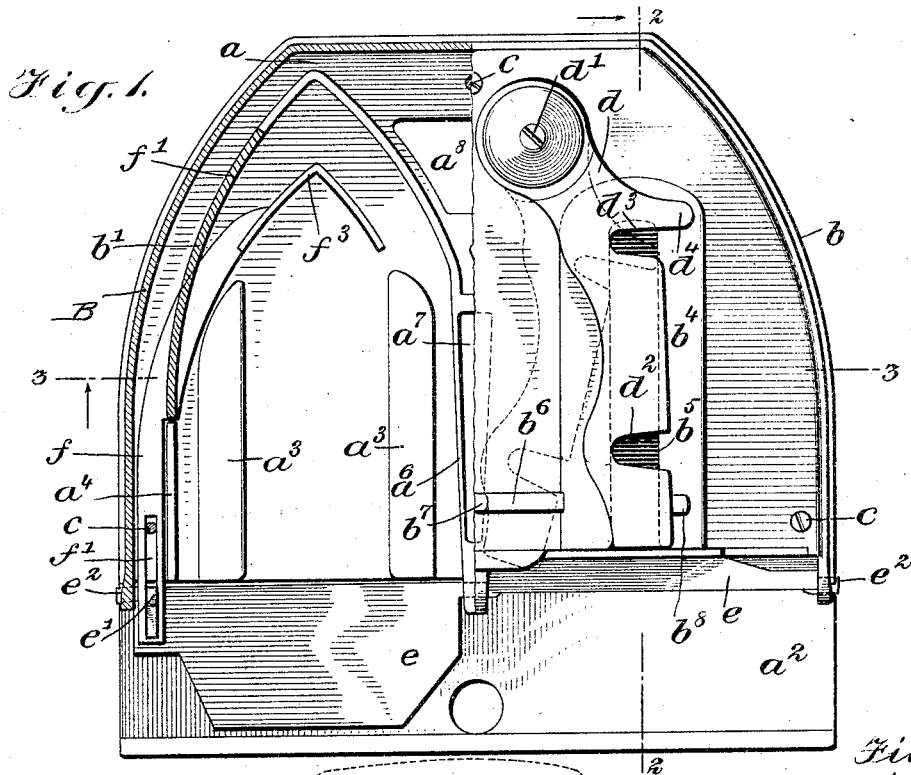

Patented May 2, 1905.

UNITED STATES PATENT OFFICE.

JULIUS A. LOFSTEDT, OF YONKERS, NEW YORK.

FLAT-IRON HEATER.

SPECIFICATION forming part of Letters Patent No. 788,920, dated May 2, 1905.

Application filed June 20, 1904. Serial No. 213,319.

*To all whom it may concern:*

Be it known that I, JULIUS A. LOFSTEDT, a citizen of the United States, and a resident of Yonkers, in the county of Westchester and State of New York, have invented a new and Improved Flat-Iron Heater, of which the following is a full, clear, and exact description.

My invention relates to an opening and closing flat-iron heater.

The principal objects of the invention are to provide means for securing the proper heating of flat-irons, for preventing the waste of heat by heating them in the wrong portions, and for providing means for closing the heater when the flat-iron is introduced and opening it when the flat-iron is withdrawn.

Reference is to be had to the accompanying drawings, forming a part of this specification, in which similar characters of reference indicate corresponding parts in all the figures.

Figure 1 is a plan view of a preferred embodiment of my invention, showing portions thereof broken away and in section and showing two doors in different positions. Fig. 2 is a sectional view on the line 2 2 of Fig. 1. Fig. 3 is a sectional view on the line 3 3 of Fig. 1; and Fig. 4 is a fragmentary sectional view similar to a part of Fig. 2, showing the parts in different position.

In the drawings, $a$ represents a base, and $b$ a cover. The two fit together and jointly constitute one or more receptacles for the irons. A flange B extends downwardly from the cover $b$ and incloses these receptacles. The base is provided with a downwardly-extending projection $a'$, designed for supporting it upon a gas or other stove, and has a rear projection $a^2$, the purpose of which will be referred to later. It is also preferably provided with raised portions $a^3$, constituting ways for the support and guidance of the irons.

$a^4$ represents a wall extending part way around the base and constituting the external portion of the receptacle for the iron. This wall is not continuous, but is provided with a depression $a^5$ in one side thereof. The portion of the base within the wall $a^4$ is solid, and consequently no heat can pass through it except by conduction. In the form illustrated the heater is provided with two of these solid portions and two marginal walls $a^4$ for containing a pair of irons. Where the two receptacles come together the wall is made double, as at $a^6$, and an opening $a^7$ is formed through the base portion for the purpose of permitting the ready transfer of heat through the base portion and around the irons by convection. It will be observed that the heat is thus applied at the upper part of the irons, where it is stored, so as to supply constant heat to the bottom surfaces of the irons for the purpose of keeping them at a more even temperature than is the case when the bottoms of the irons are directly heated, and the upper portions form a conducting medium through which the heat may be distributed. $a^8$ is another opening, formed in a convenient place, as shown, for the same purpose.

The cover $b$ has a flat top and slightly-inclined sides, as shown, for the purpose of securely covering the base and providing a space for the irons. It is also provided with a depending partition $b'$, which extends down in registration with the wall $a^4$ and has a tongue $b^2$ to enter the space $a^5$, as shown in Fig. 2. This wall will obviously be of substantially the shape of a flat-iron or whatever number of flat-irons it is designed to heat in the device. In the present instance it is of such shape as to include two irons, and the central wall $b^3$, which registers with the walls $a^6$ of the base portion, is formed of a single piece of metal and so placed as to come in the center of the space $a^7$. This permits the heat from the space $a^7$ to be transferred to both irons equally and without interruption. In the vicinity of the opening $a^8$ the partitions $b'$ do not come into close contact with the walls $a^4$, but are sufficiently far from them to permit the heat to pass through freely. The cover and base are secured together by means of bolts $c$ or in any desired or convenient manner. The cover is provided with bosses $b^4$, one for each iron, each of which is provided with a longitudinal slot $b^5$ for receiving the handle of the iron. On the top of the cover is pivoted at the point $d'$ a plate $d$, which is intended to assume two positions. (Shown in full and dotted lines in Fig. 1.) This plate is provided with slots $d^2$ $d^3$, which are intended to register with and correspond with the handle of the flat-iron, and it has a projection $d^4$. This plate is designed to normally remain in the position shown in dotted lines in Fig. 1, but when an iron is introduced the front portion of the handle will come into contact with the projection $d^4$ and as the iron is pushed farther in it will act on it to cause the plate to assume the position shown in full lines. Upon withdrawing the iron the rear portion of the handle will come in contact with the side of the slots $d^2$ and $d^3$ and will cause the plate to swing back into the position shown in dotted lines. $b^6$ is a projection on the top of the cover, of the same height of the bosses $b^4$, and it is provided with a stop $b^7$ for the plate $d$. $b^8$ is another stop for the plate $d$.

$e$ represents a door for the open rear end of the cover, and it is provided with a projection $e'$ and with trunnions $e^2$, by means of which it is pivotally mounted with respect to the base and the cover. The means for operating the door, which I have illustrated, comprise a plate $f$, having a slot $f'$, through which passes the bolt $c$ and in which engages the projection $e'$. The rear portion of the plate is preferably bent upward, as shown at $f^2$, and the front portion is provided with a projection $f^3$, which is shaped substantially like the front end of a flat-iron and is designed to be engaged by the flat-iron when the latter is pushed into the heater, so as to automatically close the door. The way in which this action is accomplished will be obvious. The movement of the plate inwardly by the contact of the iron with the portion $f^3$ will cause the door $e$ to be rotated on its pivots $e^2$ and will force the door from the position shown at the left in Fig. 1 to the position shown at the right. It will be observed that upon introducing an iron into a heater of this character the plate $d$ and the door $e$ will be closed, thus preventing the escape of heat and securing the greatest efficiency of the device. Upon starting to remove the iron it will also be obvious that the plate and door are opened to permit the iron to be taken out.

A very important feature of my invention consists in the manner in which the passages for the transmission of heat are arranged. The irons are protected from excessive temperature, and the ironing-surfaces are protected from the direct action of the heating means, and consequently from corrosion and other injurious effects. Furthermore, an even distribution of heat is effected, and the upper surface is heated hotter than the lower surface, which will insure the retention of heat for a longer time than in those forms of heaters in which the upper surface of the iron is the cooler and abstracts heat from the lower surface during the operation of ironing. An even temperature is also secured throughout the whole furnace.

While I have described a particular embodiment of my invention, it will be apparent that the latter is not strictly limited thereto, but that many modifications may be made therein without departing from the spirit of my invention, the scope of which is defined in the appended claims.

Having thus described my invention, I claim as new and desire to secure by Letters Patent—

1. A flat-iron heater comprising a base, a cover having a slot for receiving the handle of the flat-iron and an open end, a pivoted plate for said slot, a rear door for said open end, means adapted to be engaged by a flat-iron for closing the door and means adapted to be engaged by the flat-iron for simultaneously swinging the plate over the slot when the iron is placed in the heater.

2. An iron-heater, comprising a base, a cover having a space for an iron, an open rear end and a slot for receiving the handle of the iron, a pivoted plate for covering said slot, a door for said open end, means for causing the introduction of the iron to close said cover-plate and door, and means for causing the withdrawal of the iron to open the cover-plate and door.

3. In a flat-iron heater, the combination of a base, a cover having an opening, a pivoted door for said opening having a projection, and means for opening and closing the door comprising a slide mounted on the base and having a portion adapted to be engaged by a flat-iron and a slot for receiving said projection.

4. In a flat-iron heater, the combination of a base, a cover having two depending walls near the periphery of the base and an opening, a pivoted door for said opening, and means for opening and closing the door, comprising a slide mounted on the base below the space between said walls, and having a portion adapted to be engaged by a flat-iron, said portion extending within the inner one of said walls, and means on the slide for engaging the door.

5. In a flat-iron heater, the combination of a base, a cover having two depending walls near the periphery of the base and an opening, a door for said opening pivotally mounted with respect to the base and cover, and means for opening and closing the door, comprising a slide having a portion substantially the shape of the end of a flat-iron and adapted to be engaged by a flat-iron, said end extending within the inner one of said walls and also having a portion located below the space between said walls and provided with a longitudinal slot and a bolt for fastening the cover and base together, said bolt passing through said slot.

6. In a flat-iron heater, the combination of a base, a cover having an open end, a door for said open end pivotally mounted with respect to the base and cover and having a projection, and means for opening and closing the door comprising a slide having a portion of substantially the shape of the end of a flat-iron and adapted to be engaged by a flat-iron, and also having an upturned portion provided with a slot for receiving said projection.

7. In a flat-iron heater, the combination of a base, a door pivotally mounted thereon, means for operating the door comprising a slide having a portion adapted to be engaged by a flat-iron and a portion adapted to engage the door, a cover fitting said base and having a slot for the reception of a flat-iron handle and an open end adapted to be closed by said door, and a plate pivoted to said cover and adapted to close said slot: said plate having a projection adapted to be engaged by the handle of the flat-iron.

8. A flat-iron heater having a base provided with a solid portion adapted to support a flat-iron, and having marginal walls constituting a portion of a receptacle for a flat-iron, said base having openings outside of said walls for the passage of heat, and a cover fitting over said base.

9. A flat-iron heater having a base provided with a plurality of solid imperforate portions each having a marginal wall constituting a portion of a receptacle for an iron, said base having openings located between said walls for the passage of heat, and a cover fitting over said base and having depending partitions extending to the vicinity of the tops of said walls.

10. A flat-iron heater having a base provided with a plurality of solid imperforate portions having marginal walls constituting part of a plurality of receptacles for flat-irons and having an open end, a cover fitting over said base and having depending partitions extending to the vicinity of the tops of said walls, said base being provided with perforations between the outside surfaces of said walls, a door for said open end, and means adapted to be engaged by a flat-iron for closing the door when the iron is introduced into the heater.

In testimony whereof I have signed my name to this specification in the presence of two subscribing witnesses.

JULIUS A. LOFSTEDT.

Witnesses:
   CARL EICKEMEYERS,
   WILLIAM DEATS.